Oct. 14, 1969 W. M. AUSTIN 3,473,052

SYSTEM FOR PRODUCING INDICATIONS OF TIME RELATIONSHIP OF ELECTRICAL SIGNALS

Original Filed Feb. 2, 1965

INVENTOR.
WAYNE M. AUSTIN
BY
Eugene M. Whitmore
Attorney

United States Patent Office 3,473,052 Patented Oct. 14, 1969

3,473,052

SYSTEM FOR PRODUCING INDICATIONS OF TIME RELATIONSHIP OF ELECTRICAL SIGNALS

Wayne M. Austin, Morris County, N.J., assignor to RCA Corporation, a corporation of Delaware Continuation of application Ser. No. 429,711, Feb. 2, 1965. This application May 8, 1968, Ser. No. 727,747
Int. Cl. H03k 17/00, 5/00
U.S. Cl. 307—269 5 Claims

ABSTRACT OF THE DISCLOSURE

Phase discriminator circuits particularly adapted for control of television deflection systems. A single substantially unidirectionally conductive transistor is supplied with a reference synchronizing pulse and with a waveform representative of the time occurrence of deflection current. The transistor supplies energy to capacitive energy storage means upon deviation of the applied waveforms in one sense from a reference time relationship. Resistive means coupled across the energy storage means dissipate stored energy in the absence of conduction by the transistor.

Figure 1:
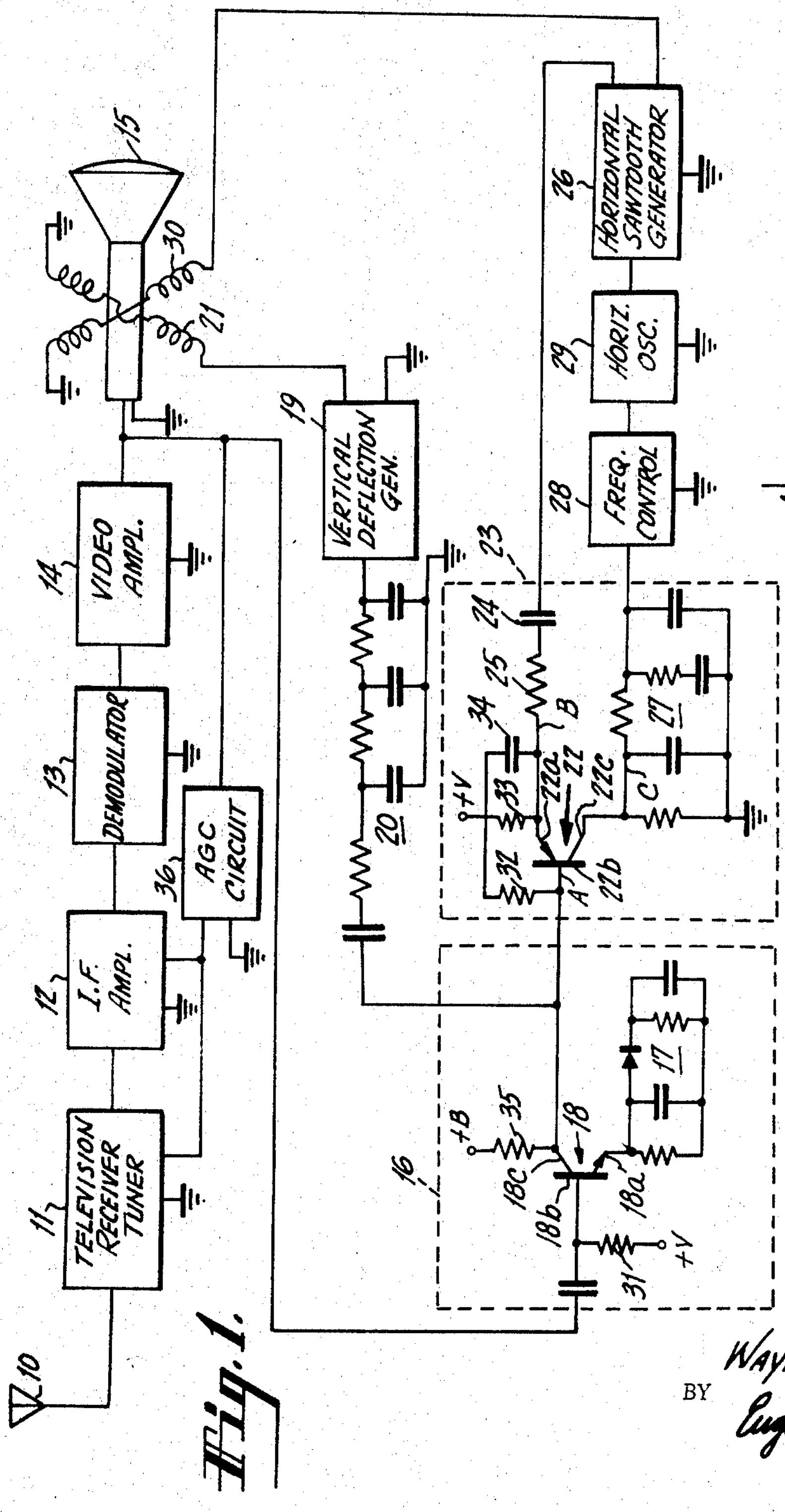

This is a continuation of application Ser. No. 429,711 filed Feb. 2, 1965 and now abandoned.

This invention relates to apparatus for producing indications representative of the time relationship of a first electrical signal with respect to a second electrical signal. More specifically, this invention relates to a semiconductor "phase discriminator" circuit for producing a unidirectional control potential representative of the time or phase relationship between two electrical signals.

The invention is particularly useful in connection with automatic frequency control (AFC) systems for synchronizing the line deflection circuits of television receivers and will be described further in connection with use in such apparatus.

In television receivers, the line or horizontal deflection circuits provide a sawtooth current waveform to deflection coils associated with a cathode ray display tube so as to sweep an image-producing electron beam across the face of the cathode ray tube in a regular scanning pattern. Horizontal synchronizing pulses, which form part of the composite signal received and processed by the television receiver, are compared in the automatic frequency control system with a sample waveform related to the sawtooth current deflection waveform. The automatic frequency control system supplies a correction signal to the horizontal deflection waveform generating circuits based upon the above waveform comparison to maintain the deflection waveform in synchronism as to both phase and frequency with respect to the horizontal synchronizing pulses.

Heretofore, a number of different types of phase discriminator circuits have been utilized in AFC systems for television receivers, the most commonly used type employing a pair of diodes and resistance and capacitance elements arranged in a balanced circuit configuration. Alternative phase discriminator circuits utilizing a single "symmetrical" semiconductor device have also been proposed for use in television receivers (see, for example, U.S. Patent No. 2,876,382 entitled "Phase Comparison," granted to George C. Sziklai, Mar. 3, 1959 and assigned to the same assignee as the present invention).

The present invention provides apparatus for producing indications representative of the time relationship between two electrical signals which achieves considerable simplification of circuitry and/or reduction in cost of components with respect to such prior configurations while maintaining highly acceptable performance.

It is an object of the present invention to provide a phase discriminator circuit employing a single, relatively inexpensive, asymmetrical semiconductor device.

It is a further object of the present invention to provide a phase discriminator circuit employing a single semiconductor device which may be directly coupled to the synchronizing signal separator circuit in a television receiver.

It is a still further object of the present invention to provide a direct-coupled phase discriminator circuit wherein operating characteristics are substantially unaffected by variations in power supply potential.

In accordance with the present invention, a phase discriminator circuit comprises an asymmetrical semiconductor device having a first terminal to which a first electrical signal is applied, a second terminal to which a second electrical signal is applied and a third terminal coupled to a capacitive energy storage device at which is developed a unidirectional potential representative of the time relationship between the first and second electrical signals. Resistive energy dissipative means are coupled to the energy storage means for dissipating the energy stored therein in the absence of conduction by the semi-conductor device.

Figure 2:
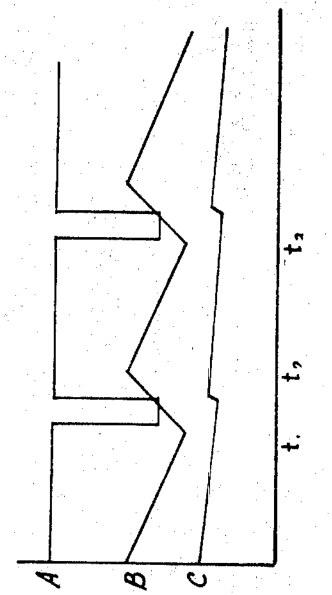
Figure 3:
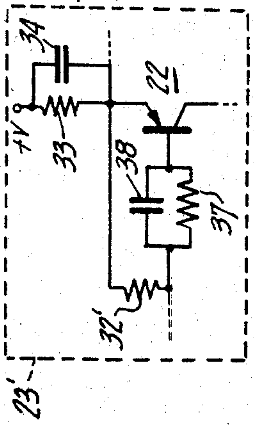

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

FIGURE 1 is a schematic circuit diagram, partially in block diagram form, of the image-reproducing portion of a television receiver embodying the invention;

FIGURE 2 is a series of wave form diagrams, drawn on common scales of potential vs. time, to which reference will be made in the explanation of the operation of the circuit of FIGURE 1; and FIGURE 3 is a partial schematic circuit diagram of a modified embodiment of the present invention which may be used wherein signals received from several different broadcast stations differ in strength one from the other in a substantial manner.

Referring to FIGURE 1, apparatus, for producing indications of the time relationship of electrical signals in accordance with the present invention is shown as it may be used in connection with the automatic frequency control (AFC) system of a television receiver. The television receiver is shown in large part in block diagram form since the overall construction thereof is well known.

The television receiver includes an antenna 10 for receiving composite television signals and for coupling such signals to a television receiver tuner 11. The tuner 11 normally includes one or more radio frequency amplifier stages tunable to a plurality of frequencies corresponding to television broadcast signals and a frequency converter for converting the radio frequency signals to intermediate frequency (I-F) signals. The receiver further includes an intermediate frequency (I-F) amplifier 12 and a demodulator 13, the later serving to derive the composite television signals from the intermediate frequency signals. A video amplifier 14, coupled to the output of demodulator 13, supplies amplified composite television signals representative of an image to be displayed to a control electrode of a television kinescope 15. The output of video amplifier 14 also is coupled to AGC circuit 36, the latter, in turn, being coupled to the R-F amplifier stages in tuner 11 and to I-F amplifier 12 to control the gain thereof in accordance with the amplitude of the received signal and thereby maintain the output of video amplifier 14 substantially constant over a wide range of input signal levels. The amplified composite television signal is also coupled from video amplifier 14 to a synchronizing signal separator circuit 16. The sync separator circuit 16 may, for example, be of the type shown in U.S. Patent No. 2,950,343, entitled "Noise Immune Amplitude Discriminatory System," granted Aug. 23, 1960 to Hunter C. Goodrich and assigned to the same assignee as the present invention.

Sync separator circuit 16 includes a "double time constant" circuit 17 coupled to the emitter **18*a* of transistor 18** to permit separation of horizontal and vertical synchronizing information from the applied composite video signal without undue interaction therebetween and with minimum interference from extraneous noise components.

Sync separator circuit 16 supplies vertical synchronizing pulses to a vertical deflection signal generator 19 by means of an integrating circuit 20 arranged to respond to vertical but not horizontal synchronizing signals. Vertical deflection signal generator 19 is coupled to the vertical deflection yoke 21 associated with kinescope 15.

Periodic horizontal synchronizing pulses derived from sync separator circuit 16 are directly coupled to the base electrode **22*b* of an asymmetrical (i.e. predominantly unilaterally conductive) transistor 22 in a phase discriminator circuit 23, the transistor 22 also being supplied, via capacitor 24 and resistor 25 coupled to emitter electrode 22*a*, with a second periodic signal related in time to the horizontal scanning waveform produced by horizontal sawtooth waveform generator 26. A resistive-capacitive energy storage circuit 27 is coupled to collector electrode 22*c* and serves as a means for storing a signal or potential representative of the displacement from a reference time relationship of the periodic signals applied to base 22*b* and emitter 22*a*. Energy storage circuit 27 is, in turn, coupled to a frequency control circuit 28 associated with a horizontal oscillator 29. Horizontal oscillator 29 may for example, be a blocking oscillator, in which case frequency control circuit 28 comprises resistance and capacitance elements (not shown) for regulating the repetition rate of the oscillator in the well-known manner. The output of oscillator 29 is coupled to a horizontal sawtooth waveform generator 26 which, in turn, is coupled both to phase discriminator 23 as noted above and to a horizontal deflection yoke 30 associated with kinescope 15**.

The biasing arrangement of sync separator circuit 16 and phase discriminator 23 now will be described. A first potential source of relatively low positive direct potential designated +V (e.g. $+V=+16$ volts) is coupled via resistor 31 to base electrode **18*b* of transistor 18 and via resistor 32 to base electrode 22*b* of transistor 22. Emitter electrode 22*a* of transistor 22 is also returned to +V by means of resistor 33 to minimize the effect of variations in the potential +V. Resistor 33 is also coupled in parallel with a capacitor 34. The collector electrode 18*c* of transistor 18 is coupled via resistor 35 to a second positive direct potential source designated +B, the latter being of substantially higher potential than the source +V (e.g. $+B=+135$ volts). Emitter 18*a* of transistor 18 and collector 22*c* of transistor 22 are returned to a reference potential such as ground potential by means of R-C circuits 17 and 27**, respectively.

Base **22*b* of transistor 22 and collector 18*c* of transistor 18 are directly coupled one to the other and are therefore supplied with a common bias potential determined by the potential difference between the sources +B and +V and the ratio of resistors 32 and 35. This common bias potential may, for example, be of the order of +25 volts, a potential substantially more positive than the bias potential applied to emitter 22*a* of transistor 22. Transistor 22 is therefore biased substantially beyond cutoff, i.e. there is no current flow in the emitter-collector output circuit of transistor 22 until a substantial negative-going signal is applied to base 22*b* and/or a substantial positive signal is applied to emitter 22*a***.

Referring to FIGURE 2 in connection with FIGURE 1, the specific operation of phase discriminator circuit 23 in connection with the television receiver now will be described. A description of operation applicable to synchronizing signal separator circuit 16 appears in the Goodrich patent noted above and therefore will not be repeated here. It will be sufficient to note that, with the bias potentials described above and a standard television signal applied to antenna 10, transistor 18 typically produces at its collector electrode **18*c*** periodic horizontal synchronizing pulses of the type shown in FIGURE 2, waveform A.

Waveform A varies between a first potential level equal to the bias potential applied to collector electrode **18*c* of transistor 18 and a second potential level less positive than the first. The second potential is substantially fixed in magnitude for all normal levels of received signal and is determined by the gain of transistor 18 and the emitter bias potential thereof established by circuit 17. Specifically, the lower potential level of waveform A is clamped at substantially the potential of emitter 18*a* each time transistor 18** is driven to conduction by an applied synchronizing pulse.

The periodic sawtooth potential waveform B, related in phase and frequency to the horizontal scanning current waveform produced at sawtooth generator 26, is applied to emitter **22*a* of transistor 22. The sawtooth waveform B is produced by applying the flyback potential produced at the horizontal output transformer (not shown) of sawtooth generator 26 to an integrating circuit comprising resistor 25 and capacitor 34**. The increasing portion of $t_1$ *to* $t_2$ of waveform B occurs in time coincidence with the retrace or flyback portion of a horizontal scanning cycle while the decreasing portion $t_2$ to $t_3$ of waveform B occurs substantially in time coincidence with the trace portion of the scanning cycle. In the illustrated embodiment of the present invention, horizontal oscillator 29 is considered to be oscillating in synchronism with the received horizontal synchronizing pulses (waveform A) when the waveforms A and B recur in the time relationship shown in FIGURE 2. In that case, the base-emitter junction of transistor 22 is reverse-biased (i.e. no output current flows) throughout each scanning cycle with the exception of the portion of the cycle wherein waveform B is at a higher positive potential than waveform A (see, for example, the trailing edge of the sync pulse of waveform A). When the potential at emitter **22*a* (waveform B) rises above the potential at base 22*b*, transistor 22 provides a conductive path from supply +V to energy storage circuit 27. The resultant current flow produces an increase in the energy stored in the capacitive elements in circuit 27 and the potential at collector 22*c* (waveform C) increases. During the interval between synchronizing pulses, the potential at collector 22*c* decreases exponentially at a rate determined by the effective discharge time constant of circuit 27. This series of events is repeated each scanning cycle so long as oscillator 29 remains in synchronism with the horizontal synchronizing pulses. A direct potential derived from waveform C is coupled to frequency control 28** to maintain the desired synchronism.

If any disturbance occurs in the system or in received signals such as to cause an effective time displacement of waveform B to the left, conduction through transistor 22 increases, producing an increased potential at collector **22*c* (waveform C). The increased control potential causes a decrease in the oscillation frequency of oscillator 27** and therefore shifts waveform B back to the "in synchronism" relation with respect to waveform A.

If waveform B shifts to the right, conduction through transistor 22 decreases and ceases entirely since the base-emitter junction of transistor 22 quickly becomes reverse-biased. Since transistor 22 does not conduct, the potential at collector **22*c* (waveform C) continues to decrease exponentially for a period in excess of an entire scanning cycle. The effective direct potential coupled to frequency control 28 therefore decreases and oscillator 29** speeds up or increases its output frequency so as to return the waveforms A and B to the desired reference time relationship.

It should be noted that the circuit described above ordinarily need only provide corrections to overcome relatively short duration and relatively small magnitude disturbances in the frequency of oscillator 29 since it is common practice to provide a manually adjustable "hold" control in frequency control 28 in addition to the described automatic frequency control circuit.

While the invention has been described in terms of a circuit utilizing an n-p-n transistor in sync separator circuit 16 and a p-n-p transistor in phase discriminator 23, it should be recognized that other combinations of devices may also be used according to the desired polarity of the frequency control potential to be developed by discriminator 23.

It has been found that in applications of the invention wherein the television receiver includes a keyed AGC system, certain modifications may be desirable to improve the performance of the automatic frequency control system.

For example, if the receiver is tuned to a relatively weak signal or channel and then is switched to a strong signal, the slow-acting AGC system temporarily permits a signal of excessive amplitude to pass through the receiver. In that case, the amplitude of the synchronizing pulses applied to sync separator circuit 16 increases. Transistor 18 is then overdriven. The excess carriers stored in transistor 22 result in the transistor conducting for a time longer than the duration of the synchronizing pulse. The trailing edge of the output pulse is therefore displaced to the right in FIGURE 2. The automatic frequency control system responds to the spreading or increase in duration of the output pulses as if a shift had occurred in the time relationship between the synchronizing pulses and the waveform B derived from horizontal sawtooth generator 26. The automatic frequency control system then provides a signal to decrease the frequency of oscillator 29 to compensate for the supposed error and thereby produces a timing error of opposite sense. The AGC system, which is normally keyed during the synchronizing pulse interval by means of a signal derived from horizontal generator 26, is then keyed at a time preceding the synchronizing pulse, i.e. when a lower level video signal appears at the output of video amplifier 14. The AGC circuit 36 senses the lower level signal and increases the receiver gain still further. The cycle of events is repeated in a regenerative fashion further degrading receiver performance.

The above described problem may be avoided in a receiver employing a keyed AGC system and a phase discriminator constructed in accordance with the present invention by utilizing the circuit shown in FIGURE 3. A differentiating circuit comprising a resistor 37 and a capacitor 38 is inserted between collector **18*c* and base 22*b*. The resistor 32' is selected for desired bias conditions, taking into account the added resistor 37. The differentiating circuit modifies the operation of the phase discriminator 23' with respect to discriminator 23** in that the time or phase comparison between signals is referred to the leading edge rather than the trailing edge of the synchronizing pulses in the circuit of FIGURE 3.

What is claimed is:

1. Apparatus for producing indications of the time relationships of electrical signals comprising:

a single, substantially unilaterally conductive, asymmetrical, semiconductor device having an input circuit and an output circuit, said input circuit including first and second input terminals, biasing means coupled to said input terminals for supplying thereto bias potential sufficient to maintain said semiconductor device in cutoff condition in the absence of input signals, capacitive energy storage means coupled to said output circuit for storing an electric potential, separate means comprising a first signal source coupled to said first input terminal for supplying thereto first periodic electrical signals having a predetermined duration, a polarity tending to render said semiconductor device conductive and an amplitude insufficient alone to render said device conductive, said separate means further comprising a second signal source coupled to said second input terminal for supplying thereto second periodic electrical signals having a first portion of greater duration than said predetermined duration, said first portion varying between first and second amplitude tending to render said device non-conductive and conductive, respectively, said second amplitude being insufficient alone to render said device conductive, said first and second signals upon deviation of said signals in one sense from a reference time relationship, have sufficient relative amplitudes jointly to render said device conductive so as to provide a unilateral conductive path to said capacitive energy storage means for an increased time duration and upon deviation of said signals in an opposite sense from said reference relationship said signals have relative amplitudes to decrease conduction time of said device substantially to zero, so as to store on said capacitive means a potential representive of said deviation, said semiconductor device thereby conducting for a time duration less than said predetermined duration when said signals occur in said reference time relationship, and resistive energy dissipative means including at least one resistor continuously connected in circuit with said capacitive energy storage means for discharging said energy storage means both during intervals between said first periodic signals and upon deviation of said signals in said opposite sense whereby the potential developed at said energy storage means is representative of the time relationship of said first and second periodic signals.

2. Apparatus in accordance with claim 1 wherein:

said separate means comprises a first source of periodic signals for supplying periodic pulse signals to said first input terminal and a second source of periodic signals for supplying an alternately increasing and decreasing signal to said second input terminal.

3. Apparatus in accordance with claim 2 and further comprising:

biasing means coupled to said input terminals for supplying thereto bias potential sufficient to maintain said semiconductor device in cutoff condition in the presence of said first periodic pulse signals.

4. In a television receiver having a generator for producing a periodic sawtooth scanning current to deflect an electron beam across an image-producing kinescope and and an automatic frequency control system for maintaining such generator in synchronism with transmitted horizontal synchronizing pulse signals, a phase discriminator circuit comprising:

a single, substantially unilaterally conductive asymmetrical semiconductor device having an input circuit and an output circuit, said input circuit including first and second input terminals, means coupled to said first input terminal for supplying thereto horizontal synchronizing pulse signals, means coupled to said second input terminal for supplying thereto a sawtooth potential related in time occurence to said scanning current, biasing means coupled to said input circuit for maintaining said semiconductor device in cutoff condition in the absence of said pulse and sawtooth signals, capactive energy storage means coupled to said output circuit for storing an electric potential representative of the relative time occurence of said synchronizing pulse signals and said sawtooth potential, said synchronizing pulse signals having a predetermined time duration, a polarity tending to render said device conductive and an amplitude insufficient alone to render said device conductive, said sawtooth potential having a first portion of greater duration than said predetermined duration, said first portion varying between first and second amplitudes tending to render said device non-conductive and conductive, respectively, said second amplitude being insufficient alone to render said device conductive, said synchronizing and sawtooth potential signals, upon deviation thereof in one sense from a reference time relationship, having sufficient relative amplitudes jointly to render said device conductive to provide a conductive path to charge said capacitive energy storage means for an increased time duration, and upon deviation of said signals in an opposite sense from said reference time relationship, said signals have relative amplitudes to decrease conduction time of said device substantially to zero, said semiconductor device thereby conducting for a time duration less than said predetermined time duration when said sychronizing pulse signals and said sawtooth potential occur in said reference time relationship, and resistive energy dissipative means including at least one resistor continuously connected in circuit with said energy storage means for discharging said energy storage means both during intervals between said synchronizing pulse signals and upon deviation of said signals in said opposite sense from said reference time relationship.

5. A phase discriminator circuit in accordance with claim 4 wherein:

said semiconductor device has base, emitter and collector electrodes, said base and emitter electrodes providing first and second input terminals, respectively, and said collector electrode being coupled to said capacitive energy storage means, said biasing means being coupled to said base and emitter electrodes for maintaining said semiconductor device in cutoff condition in the absence of said pulse and sawtooth signals, said synchronizing pulse signals altering the potential applied between said base and emitter electrodes in the sense required to initiate conduction in said device, said sawtooth potential varying alternately in the senses required to drive said transistor into and out of conduction, said reference time relationship corresponding to occurence of said synchronizing pulse signals during said first portion of said sawtooth potential signals.

References Cited

UNITED STATES PATENTS 3,015,737 1/1962 Harris ............. 307—88.5

ARTHUR GAUSS, Primary Examiner

H. A. DIXON, Assistant Examiner

U.S. Cl. X.R.

307—232, 295